United States Patent [19]
van der Lely

[11] 4,003,439
[45] Jan. 18, 1977

[54] ROTARY HARROWS

[76] Inventor: Ary van der Lely, 10, Weverskade, Maasland, Netherlands

[22] Filed: May 2, 1975

[21] Appl. No.: 574,098

[30] Foreign Application Priority Data

May 7, 1974 Netherlands ..................... 7406084

[52] U.S. Cl. .................................. 172/59; 172/125
[51] Int. Cl.$^2$ ......................................... A01B 33/06
[58] Field of Search .............................. 172/57–60, 172/125; 171/142

[56] References Cited

UNITED STATES PATENTS

| | | |
|---|---|---|
| 3,667,551 | 6/1972 | van der Lely et al. ........ 172/125 X |
| 3,821,989 | 7/1974 | van der Lely et al. .............. 172/59 |

Primary Examiner—Paul E. Shapiro
Attorney, Agent, or Firm—Mason, Mason & Albright

[57] ABSTRACT

A rotary harrow has a plurality of soil working members mounted in a row on a hollow frame portion that extends transverse to the direction of operative travel of the harrow. Each soil working member is rotatable about an upwardly extending axis through the intermediary of a first drive comprising a plurality of intermeshing pinions contained within the frame portion. A shaft defining the axis of rotation of a substantially central located soil working member is in connection with a second drive that connects to the power take off of a tractor. A third drive engages the first and second drives and is a speed reducing transmission that interconnects the first and second drives.

11 Claims, 2 Drawing Figures

ROTARY HARROWS

Figure 1:
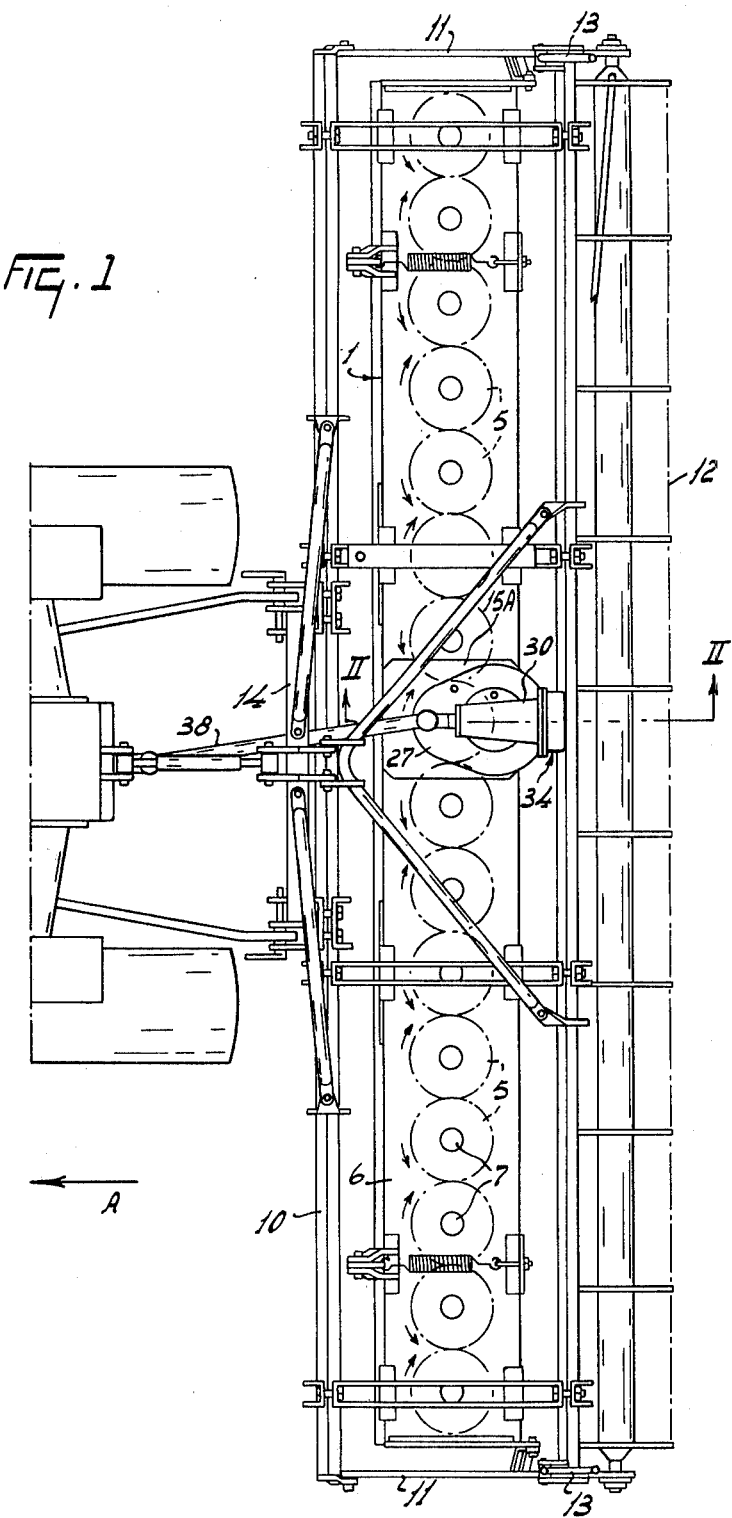
Figure 2:
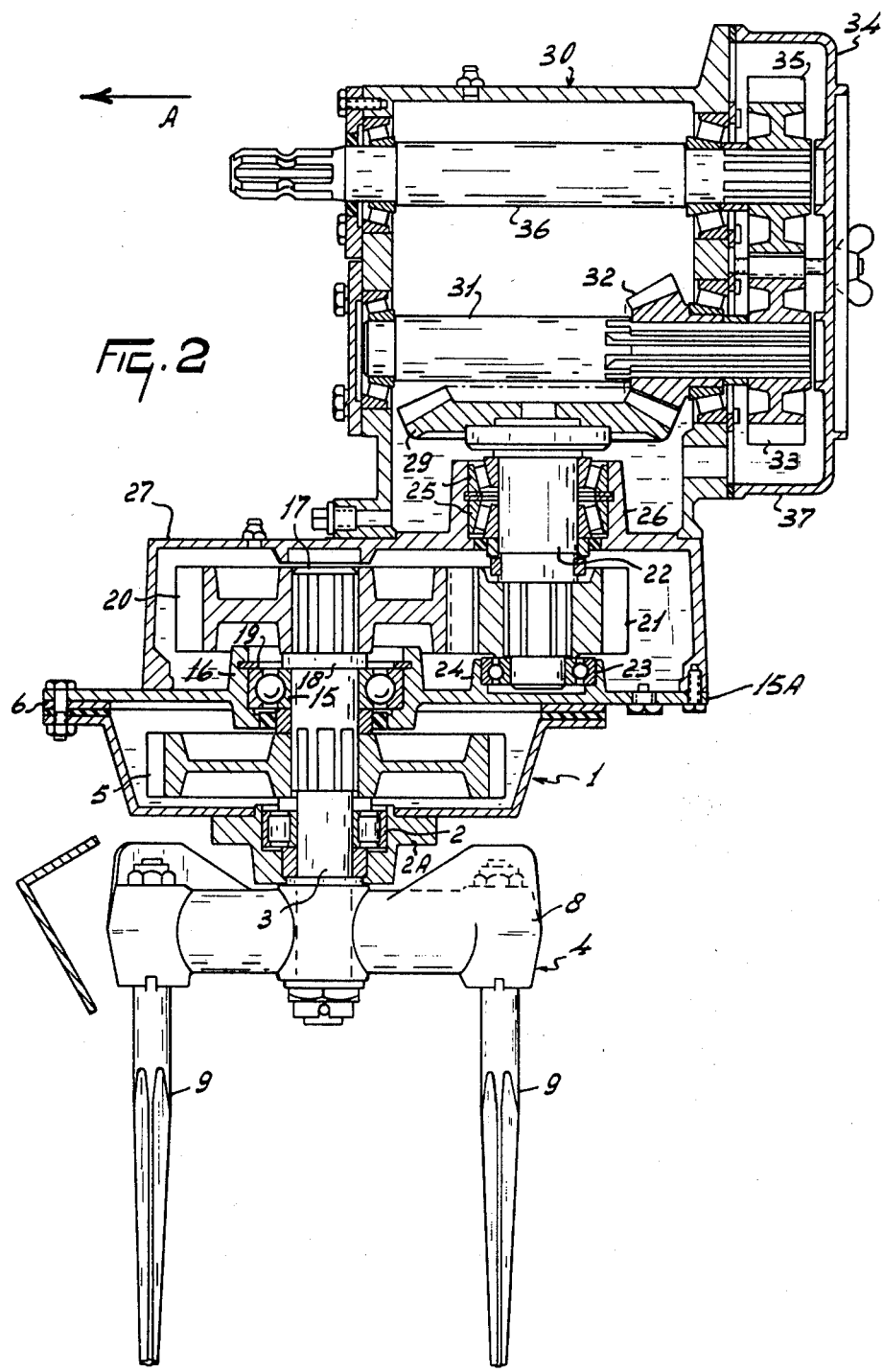

For a better understanding of the invention, and to show how the same may be carried into effect, reference will now be made, by way of example, to the accompanying drawings, in which:

FIG. 1 is a plan view of a rotary harrow in accordance with the invention connected to the rear of an agricultural tractor, and FIG. 2 is a section, to an enlarged scale, taken on the line II—II in FIG. 1.

Referring to the drawings, the rotary harrow that is illustrated, and that could also be considered as being a soil cultivating implement or cultivator, has a hollow box-shaped frame portion 1 that extends substantially horizontally transverse, and normally substantially horizontally perpendicular, to the intended direction of operative travel of the harrow which is indicated by an arrow A in the drawings. The bottom of the frame portion 1 is provided with a plurality of regularly spaced apart ball or roller bearings 2 that are accommodated in corresponding bearing housings 2A. Each bearing 2 rotatably receives part of a corresponding vertical or substantially vertical shaft 3 whose lowermost end, beneath the corresponding bearing housing 2A, carries a corresponding rotary soil working member that is generally indicated by the reference 4. In the embodiment which is illustrated in the drawings by way of example, there is a single row of sixteen of the soil working members 4 whose axes of rotation (embodied in the shafts 3) are spaced apart from one another at regular intervals which it is preferred should have magnitudes of substantially 25 centimeters. The soil working members work overlapping strips of soil during the operation of the harrow to produce a single broad strip of worked soil which, with the construction illustrated in the drawings, has an overall width of not less than substantially 4 meters. Each of the shafts 3 is formed, inside the hollow frame portion 1, with a splined portion upon which is arranged a corresponding straight- or spur-toothed pinion 5. As will be evident from FIG. 1 of the drawings, the teeth of each of the sixteen pinions 5 are in mesh with those of the neighbouring pinion 5, or both of the neighbouring pinions 5, in the single row thereof. The top of the hollow frame portion 1 is closed by at least one plate 6 that is secured to a rim of the underlying remainder of the frame portion 1 by small bolts, a gasket being interposed between the or each plate 6 and the underlying rim.

The plate or plates 6 is/are provided with fifteen upper bearing housings 7 that carry upper ball or roller bearings for the uppermost ends of all of the shafts 3 except for one shaft of the center pair of the row thereof which shaft is the one illustrated in detail in FIG. 2 of the drawings. The sixteen soil working members 4 at the lowermost ends of the 16 shafts 3 each comprise a substantially horizontal tine support 8 whose opposite ends incorporate substantially vertically disposed and substantially cylindrical tine holders that firmly but releasably receive the fastening portions of corresponding rigid soil working tines 9.

A supporting structure that is generally indicated by the reference 10 is arranged on top of the hollow frame portion 1 and covers the whole of the transverse length of that frame portion. The opposite ends of the supporting structure 10 have two corresponding arms 11 connected to them so as to be turnable upwardly and downwardly about a single substantially horizontal axis that is substantially parallel to the transverse length of the frame portion 1. The arms 11 extend rearwardly from their pivotal mountings with respect to the direction A and their rearmost free ends carry a rotatable supporting member 12, in the form of an open ground roller, the member 12 being located behind the soil working members 4 with respect to the direction A. The arms 11 are upwardly and downwardly turnable about their aligned pivotal mountings, together with the rotatable supporting member 12, so that the level of that member 12 can be varied relative to that of the supporting structure 10. Height adjustment assemblies that may be of a construction which is known per se, and which include screwthreaded spindles having crank handles 13, interconnect the two arms 11 and the supporting structure 10 near the opposite ends of the rotatable supporting member 12. Manual rotation of the crank handles 13 in appropriate directions will turn the arms 11 upwardly or downwardly relative to the structure 10 about their aligned pivotal connections to that structure. A central leading region, with respect to the direction A, of the supporting structure 10 is provided with a coupling member or trestle 14 that is constructed and arranged to enable the structure 10 to be placed in connection with the three-point lifting device or hitch at the rear of an agricultural tractor or other operating vehicle in the manner which can be seen in outline in FIG. 1 of the drawings.

The shaft 3 that is shown in detail in FIG. 2 of the drawings has an upward extension 17 which is rotatably journalled, by means of a ball bearing 15, in a housing 16 that forms an integral part of a substantially horizontal plate 15A, said plate 15A, being secured to the top of the plate or plates 6 in immediately overlying relationship with the latter. The shaft extension 17 is provided, immediately above the ball bearing 15, with a flange 18 of enlarged diameter against which abuts the upper end of the inner race of said bearing 15. The outer race of the bearing 15 is retained in its appointed position by an overlying circlip 19 whose outer edge engages in a groove in the internal wall of the housing 16. The shaft extension 17 is splined above the flange 18 and a straight- or spur-toothed pinion 20 whose hub is correspondingly splined is mounted on the uppermost end of the shaft extension 17 in such a way that the lowermost end of said hub bears against the top of the flange 18. The teeth of the pinion 20 are in driven mesh with those of a further pinion 21 that is mounted, by way of co-operating splines, on a shaft 22 whose lowermost end, beneath the splined portion thereof, is rotatably received in a housing 24 near the rear of the plate 15A with the aid of a ball bearing 23. The diameter of the pinion 21 is half that of the pinion 20. A region of the shaft above the pinion 21 is rotatably received in a housing 26 with the aid of twin oppositely directed conical roller bearings 25. The housing 26 is an integral part of a screening box 27 whose lowermost edge is secured to the top of the plate 15A by bolts.

The uppermost end of the shaft 22 that projects above the housing 26 carries a bevel pinion or crown wheel 29 whose teeth are in driven mesh with those of a bevel pinion 32 that is located, with the pinion or crown wheel 29, inside a lower portion of a gear box 30. The bevel pinion 32 is mounted on a substantially horizontal shaft 31 that is rotatably journalled in the interior of the gear box 30 so as to extend substantially parallel to the direction A. As will be evident from FIG. 2 of the drawings, the shaft 31 is located immediately above the bevel pinion or crown wheel 29 and its rearmost end, with respect to the direction A, projects from the back of the gear box 30. A change-speed gear 34 is mounted at the rear of the gear box 30 with respect to the direction A and the splined rear end of the shaft 31 projects into said change-speed gear 34. The rearmost splined end of an overlying shaft 36, that is parallel to the shaft 31, also projects into the change-speed gear 34 and it will be seen from FIG. 2 of the drawings that the leading end of the shaft 36 with respect to the direction A projects forwardly in substantially that direction from the front of the gear box 30 and is splined to enable it to be placed in driven connection with the power take-off shaft of an agricultural tractor or other operating vehicle. As illustrated in FIG. 2 of the drawings, the rearmost ends of the two shafts 31 and 36 that are located within the change-speed gear 34 are provided with corresponding straight-or spur-toothed pinions 33 and 35 whose teeth are in meshing engagement with each other. The pinions 33 and 35 can be exchanged for other pairs of intermeshing pinions (not illustrated) of different sizes that can be slipped onto the splined rear ends of the shafts 31 and 36 to provide corresponding transmission ratios between the input shaft 36 and the underlying shaft 31 to that the soil working members 4 can be rotated at different speeds without altering the input speed of rotation applied to the leading end of the shaft 36. A readily releasable cover 37 of the change-speed gear 34 is maintained in place at the back of the gear box 30 by at least one wing nut or the like except at times when it is necessary for it to be removed to exchange or interchange the pinions that are slidably mounted on the splined rear ends of the shafts 31 and 36.

In the use of the rotary harrow that has been described, its coupling member or trestle 14 is connected to the three-point lifting device or hitch of an operating tractor or other vehicle and the leading end of the shaft 36 of the gear box 30 is placed in driven connection with the power take-off shaft of the same tractor or other vehicle by way of an intermediate telescopic transmission shaft 38, that is of a construction which is known per se, having universal joints at its opposite ends. It is necessary, for the operation of the rotary harrow that has been described and that is illustrated in the accompanying drawings, that it should be powered by a so-called Class 3 tractor or by some other vehicle having an equivalent power output capacity, this requirement being particularly important if the harrow is to be operated on wet and heavy soil. Class 3 tractors all have power take-off shafts that rotate at a speed of substantially 1000 revolutions per minute and the speed-reducing transmission assembly that comprises the first and second pinions 21 and 20 is provided to ensure that an input speed of substantially 1000 revolutions per minute can be reduced to the required speed of rotation of the soil working members 4. Such a speed-reducing transmission assembly is not provided in rotary harrows that are intended to be operated by tractors and like vehicles whose power take-off shafts rotate, during operation, at speeds of substantially 500 revolutions per minute, for example, 580 revolutions per minute.

By providing the speed-reducing transmission assembly that comprises the first and second pinions 21 and 20, the gear box 30 and change-speed gear 34 may be employed in the described and illustrated rotary harrow that has a working width of substantially 4 meters. However, by omitting said speed-reducing transmission assembly, the same gear box 30 and change-speed gear 34 may be employed in a drive transmission to the soil working members of a rotary harrow that has a working width of less than 4 meters and that does not need to be operated by a powerful Class 3 tractor or the like. Manufacturing costs are reduced as a result of the provision of this facility because single standard gear boxes 30 and change-speed gears 34 can be provided for use with both of the kinds of rotary harrow that have just been discussed.

Although various features of the rotary harrow that have been described, and/or that are illustrated in the accompanying drawings, will be set forth in the following claims as inventive features, it is emphasised that the invention is not necessarily limited to those features and that it includes within its scope each of the parts of the rotary harrow that has been described and/or that is illustrated in the accompanying drawings both individually and in various combinations.

What we claim is:

1. A rotary harrow attachment for connection to a prime mover, comprising a frame and a plurality of soil working members rotatably mounted on an elongated hollow portion of said frame that extends transverse to the direction of travel, said soil working members being mounted side-by-side in a row on upwardly extending shafts that are drivenly interconnected in a first drive housed in said frame portion, a second drive being operatively connected to said first drive through a third drive and the latter comprising intermeshing pinion gears of different sizes, said pinion gears being mounted on upwardly extending shafts housed within a screening box that is located substantially centrally on top of said frame portion, said second drive including gear box means positioned above said screening box and means for connecting said second drive to the power take off of the prime mover.

2. A rotary harrow attachment for connection to a prime mover comprising a frame and a plurality of soil working members rotatably mounted on a portion of said frame, said soil working members being mounted side-by-side in a row on upwardly extending shafts that are drivenly interconnected in a first drive supported by said frame portion, a second drive being operatively connected to said first drive through a third drive and the latter being a speed reducing transmission assembly of gears, means for connecting said second drive to a power takeoff of the prime mover, said third drive comprising a first rotary toothed pinion that engages a second rotary toothed pinion of that drive and the latter being located above intermeshing pinion gears of said first drive, said first pinion being rotatable about an axis that is substantially parallel to the axes of rotation of said soil working members.

3. A rotary harrow as claimed in claim 2, wherein said first rotary toothed pinion is located substantially to the rear of the axes of rotation of said soil working members with respect to the normal direction of travel.

4. A harrow as claimed in claim 2, wherein said second rotary toothed pinion is mounted on a shaft that defines the axis of rotation of a substantially central soil working member of said row and has an effective diameter which is at least substantially double that of said first rotary toothed pinion.

5. A harrow as claimed in claim 4, wherein the axis about which said first toothed pinion is rotatable and the axis of rotation of the shaft of said substantially central working member are contained in a common plane that extends substantially parallel to the normal direction of travel.

6. A harrow as claimed in claim 2, wherein said first and second rotary toothed pinions together constitute said speed-reducing transmission assembly and said assembly is housed in a screening box.

7. A harrow as claimed in claim 6, wherein said screening box is fastened to the top of said frame portion.

8. A harrow as claimed in claim 6, wherein said screening box projects rearwardly from said frame portion with respect to the normal direction of travel and a rear region of said screening box supports said gear box.

9. A rotary harrow attachment for connection to a prime mover, comprising a frame and a plurality of soil working members rotatably mounted on a portion of said frame, said soil working members being mounted side-by-side in a row on upwardly extending shafts that are drivenly interconnected in a first drive supported by said frame portion, a second drive being operatively connected to said first drive through a third drive and the latter being a speed reducing transmission assembly of gears, means for connecting said second drive to a power take off of a prime mover, said third drive comprising a first rotary toothed pinion which engages a second rotary toothed pinion of that drive and the latter being located above intermeshing pinion gears of said first drive, said first totary toothed pinion being rotatable about an axis that is substantially parallel to the axes of rotation of said soil working members, said second drive comprising transmission members in a gear box and said first drive including intermeshing pinions housed within said frame portion, the transmission members in said gear box comprising perpendicularly interconnected gears and said first rotary toothed pinion being located below those transmission members, said gear box comprising a change-speed gear assembly, whereby alternative speeds of rotation of said soil working members can be attained in response to an unchanged input speed of rotation of the power take off.

10. A rotary harrow attachment for connection to a prime mover, comprising a frame and a plurality of soil working members rotatably mounted on an elongated hollow portion of said frame that extends transverse to the direction of travel, said soil working members being mounted side-by-side in a row on upwardly extending shafts that are drivenly interconnected in a first drive housed in said frame portion, a second drive being operatively connected to said first drive through a third drive and the latter comprising intermeshing pinion gears of different sizes, said pinion gears being mounted on upwardly extending shafts housed within a screening box on top of said frame portion, said second drive including gear box means positioned above said screening box and means for connecting said second drive to the power take off of a prime mover.

11. A rotary harrow attachment for connection to a prime mover, comprising a frame and a plurality of soil-working members rotatably mounted on a portion of said frame, said soil-working members being mounted side by side in a row on upwardly extending shafts that are drivenly interconnected in a first drive supported by said frame portion, a second drive of transmission members in a gear box being operatively connected to said first drive through a third drive and the latter comprising a speed reducing transmission assembly of gears, means for connecting said second drive to a power take off of a prime mover, said third drive comprising a first rotary toothed pinion which engages a second rotary toothed pinion of said third drive and the latter being located above intermeshing pinion gears of said first drive, said first rotary toothed pinion being rotatable about an axis that is substantially parallel to the axes of rotation of said soil-working members, said first drive including intermeshing pinions housed within said frame portion, the transmission members in said gear box comprising perpendicularly interconnected gears and said first rotary toothed pinion being located below those transmission members.

* * * * *